(12) United States Patent
Benschop

(10) Patent No.: US 7,054,894 B2
(45) Date of Patent: May 30, 2006

(54) GENERATOR CIRCUIT FOR GENERATING LARGE NUMBERS

(75) Inventor: Leonard Cornelis Benschop, Eindhoven (NL)

(73) Assignee: SafeNet B.V. (NL)

( * ) Notice: Subject to any disclaimer, the term of this patent is extended or adjusted under 35 U.S.C. 154(b) by 671 days.

(21) Appl. No.: 10/219,741

(22) Filed: Aug. 16, 2002

(65) Prior Publication Data

US 2004/0034674 A1  Feb. 19, 2004

(51) Int. Cl.
*G06F 17/00* (2006.01)

(52) U.S. Cl. ......................................... 708/200; 380/44
(58) Field of Classification Search ................ 708/200; 380/44

See application file for complete search history.

(56) References Cited

U.S. PATENT DOCUMENTS 6,912,240 B1 * 6/2005 Kumar et al. ............... 375/130

2001/0031050 A1 * 10/2001 Domstedt et al. ............. 380/44

\* cited by examiner

*Primary Examiner*—D. H. Malzahn
(74) *Attorney, Agent, or Firm*—Venable, LLP; James R. Burdett

(57) ABSTRACT

The invention relates, in general, to circuits and techniques for generating numbers and, in particular, to digital semiconductor circuit for generating large numbers. For generating such large numbers a large number generator circuit is used, comprising first means having an output for providing a first operand to a first input of a processing unit, second means having an output for providing a second operand to a second input of said processing unit, an output of said processing unit being operatively connected to an input of an arithmetic unit for generating a large number, wherein said second operand is generated by said second means using a parameter having far fewer number of p bits than the number of bits of the first operand.

The use of parameters of a significant shorter length of bits has been proven to be less time consuming and much faster in generating large numbers, as special operands of a significant long length of bits are no longer to be read and written from and to the memory unit.

14 Claims, 1 Drawing Sheet

US 7,054,894 B2

GENERATOR CIRCUIT FOR GENERATING LARGE NUMBERS

TECHNICAL FIELD

The invention relates, in general, to circuits and techniques for generating numbers and, In particular, to a digital semiconductor circuit for generating large numbers with special values.

BACKGROUND ART

In cryptographic applications, for example, large numbers are used as a security or encryption key for encrypting information and messages.

For processing such large numbers, a large number processing/arithmetic circuit is used, which performs several arithmetic operations in sequence under control of a control unit using operands of a specific length. These operands and the results of the arithmetic operations are frequently stored and read from different memory locations, as specified by the control unit.

The operands used for processing large numbers also have a rather long length of digital bits, thus requiring a significant amount of space in the memory unit. The control unit, for controlling the large number generator circuit, requires considerable computing time reading such large numbers from and writing such large numbers to the memory unit.

SUMMARY OF THE INVENTION

It is an object of the present invention to provide an improved large number generator circuit, wherein the above described rather slow and time consuming reading and storing of large operands from and to a memory unit for generating a large number is avoided.

In order to accomplish the above objective, the invention provides a large number generator circuit for generating large numbers comprising, first means having an output for providing a first operand to a first input of a processing unit, second means having an output for providing a second operand to a second input of said processing unit, an output of said processing unit being operatively connected to an input of an arithmetic unit for generating a large number, wherein said second operand is generated by said second means using a parameter having far fewer number of bits than the number of p bits of the first operand.

The use of parameters of a significant shorter length of bits has been proven to be less time consuming and much faster in generating large numbers, as special operands of a significant long length of bits are no longer to be read and written from and to the memory unit.

The second means of the large number generator circuit according to the invention generate second operand using a combinational logic circuit, having at least one input of m bits, with $m \leq p$.

In a specific embodiment of the large number generator circuit according to the invention said second operand has a length of n bits, wherein all but one bits of said bits have the same binary value, wherein the position of said other bit having the other binary value is determined by said p-bit parameter.

In another specific embodiment of the large number generator circuit according to the invention said second operand has a length of n bits, wherein a number of the least significant bits of said n bits have the same binary value, and wherein said number of the least significant bits having the same binary value is determined by said p-bit parameter.

More in particular the first means of the large number generator circuit according to the invention comprises memory means, wherein at least said first operand is stored.

Furthermore said second operand can either be generated using the first means or the second means, depending on a switch/control input.

In a particular embodiment of the large number generator circuit according to the invention the large numbers are generated as a sequence of w binary words of n bits each, wherein the value $2^p \geq w*n$.

BRIEF DESCRIPTION OF THE DRAWING

The present invention will now be described with reference to the accompanying drawing, wherein.

DESCRIPTION OF A PREFERRED EMBODIMENT

Figure 1:
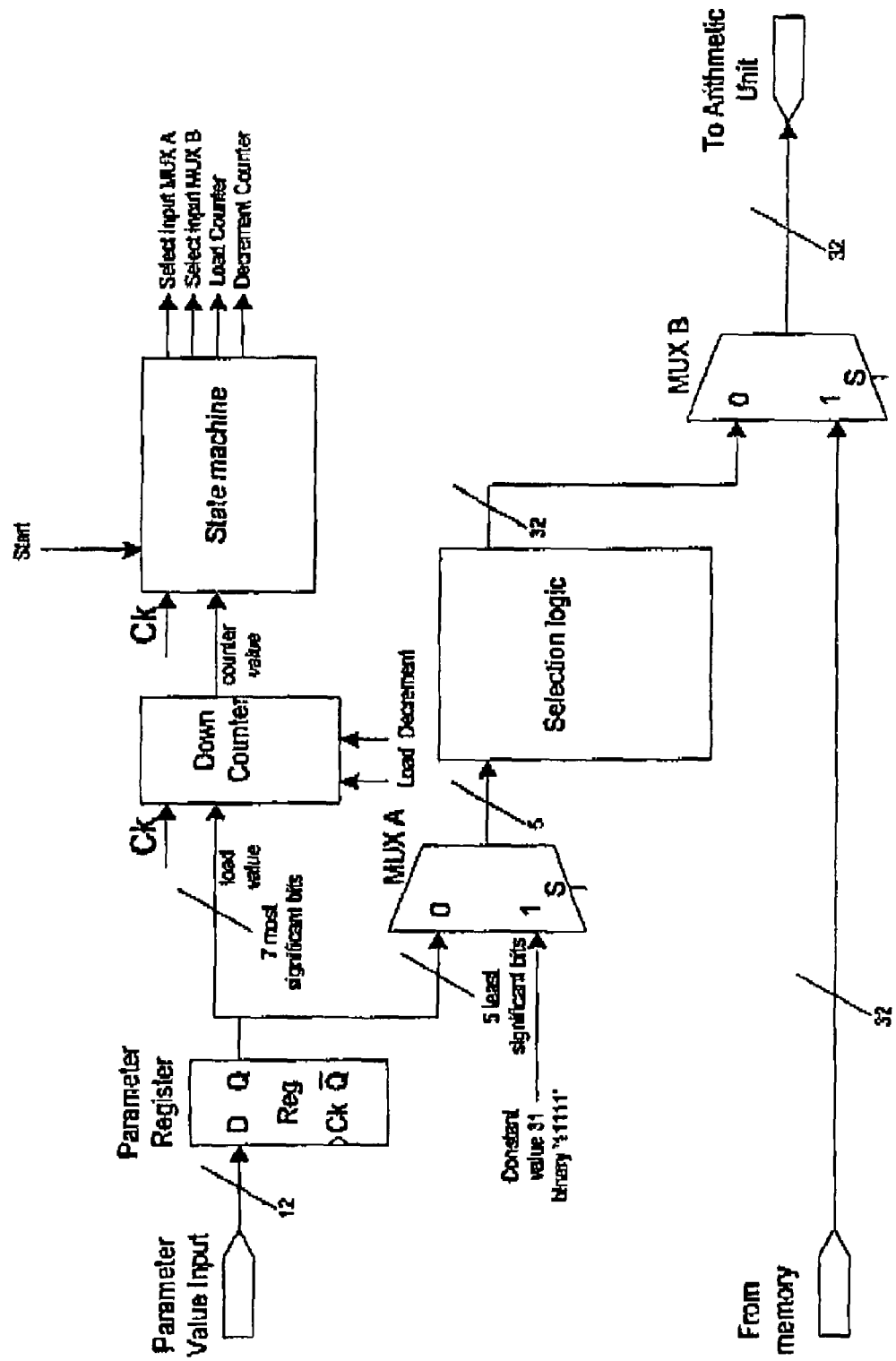
FIG. 1 shows an embodiment of a large number generator circuit according to the invention.

The circuit diagram as disclosed in FIG. 1 shows an implementation of the invention, where large numbers are processed in fixed sized words of a length of 32 bits and where the words are generated with the least significant word first. The large number generator circuit comprises a multiplexer MUX B having two inputs, indicated with 0 and 1. Input 1 of the multiplexer MUX B is operatively connected to memory means from which a first operand having a length of 32 bits is read and inputted to the multiplexer MUX B via input 1. The large number generator circuit furthermore comprises a combinational logic circuit, in FIG. 1 indicated by "selection logic", which circuit has an input and an output, the output operatively connects to the input "0" of multiplexer MUX B.

The multiplexer MUX B also incorporates an output, which is operatively connected to an arithmetic unit.

For generating a large number with a length equal to $2^n$ bits the combinational logic circuit uses a parameter having far fewer number of bits than the number of bits of the first and second operand. More in particularly said combinational logic circuit has an input with a length of m bits, which is equal or smaller than the length of bits of the parameter p. In this embodiment said parameter value is retrieved from an external source (not shown) and said parameter value has a length of 12 bits (p=12). The least significant five bits of the output of the parameter register are directly or in this embodiment Indirectly connected to the 5-bit input of the combinational logic circuit.

The other seven most significant bits of the output of the parameter register are loaded in a counter of a state machine, which will be explained in more detail herein after.

In this embodiment the five least significant bits of the output of the parameter register are operatively connected to an input 0 of an additional multiplexer MUX A, which MUX A has a second input 1 through which a constant value Is inputted. For generating a large number with a length of $2^n$ bits, where for exemplary purposes m=5 and the length of n bits of the large number is equal to 32, the large number generator circuit operates as follows.

A parameter value with a length of p bits, where p is significantly smaller than the length of the number of n bits of the first and second operand, is loaded into the parameter register. The m least significant bits (here m=5) are inputted to the input 0 of the multiplexer MUX A.

Alternatively, the m least significant bits of the output of the parameter register can be directly operatively connected to the input of the combinational logic circuit.

Preferably the large numbers are generated as a sequence of w binary words (first or second operand) of k bits each, wherein the value $2^p \geq w*k$, where p is the number of bits of the parameter value from the parameter register.

The combinational logic circuit has 5 inputs and 32 outputs and based on the 5-bit parameter Input, it generates a 32-bit number consisting of eight words, each having a lenght of 4 bits, with 31 bits set to "0" and one bit set to "1". The position of the single bit with the value "1" is specified by the binary value of the 5-bit input of the combinational logic circuit. This is illustrated by means of "Table A: Selection logic for $2^m$" below. This is an exponentiator function with base 2 and exponent m.

TABLE A

Selection logic for $2^m$.

| Input | Output |
|---|---|
| 00000 | 0000 0000 0000 0000 0000 0000 0000 0001 |
| 00001 | 0000 0000 0000 0000 0000 0000 0000 0010 |
| 00010 | 0000 0000 0000 0000 0000 0000 0000 0100 |
| 00011 | 0000 0000 0000 0000 0000 0000 0000 1000 |
| 00100 | 0000 0000 0000 0000 0000 0000 0001 0000 |
| ... | ... |
| 11110 | 0100 0000 0000 0000 0000 0000 0000 0000 |
| 11111 | 1000 0000 0000 0000 0000 0000 0000 0000 |

As seen from Table A the position of the single bit having the value "1" is determined by the binary value of the input. Said $2^5$ or 32-bit number is output as a second operand to the input 0 of the multiplexer MUX B.

In the event that for generating a large number memory means are not accessed, the input 1 "From memory" of the MUX B is set to "0", When a first operand from the memory is used by the arithmetic unit for generating a large number said memory means are accessed by setting the selection input S of MUX B to "1". The first operand having a length of 32 bits, as retrieved from the memory means, is directly passed to the arithmetic unit. However, when the arithmetic unit requires an operand with a length of 32 bits having a special value, the memory means are not accessed, but the large number generation circuit according to the invention is operated.

In such case that the arithmetic unit requires an operand with a special value, the state machine is inputted with a starting pulse, causing it to load the counter with the seven most significant bits of the 12-bit parameter of the parameter register. The state machine decrements the down counter, while setting the selection input S of MUX B to "1", resulting in an output word having a length of 32 bits with all "0". When the down counter reaches "1" the selection input S of MUX B is set to "0" for one clock cycle Ck by the state machine, so a 32-bit word with a single bit having the value "1" is output. The position of the bit, having the value "1", Is determined by the binary value of the five least significant bits of the parameter register, according to Table A.

Consequently the state machine sets the selection input S of MUX B to "1", thereby generating words with a length of 32 bits all having the value "0".

In either cases, a first or a special value second operand of fixed size words of 32 bits are inputted to an arithmetic unit for generating a large number.

In another embodiment of the invention, which uses the large number generating circuit of FIG. 1, where values $2^n-1$ are generated, is described by reference of the Table B as shown below.

TABLE B

Selection logic for $2^m - 1$.

| Input | Output |
|---|---|
| 00000 | 0000 0000 0000 0000 0000 0000 0000 0001 |
| 00001 | 0000 0000 0000 0000 0000 0000 0000 0011 |
| 00010 | 0000 0000 0000 0000 0000 0000 0000 0111 |
| 00011 | 0000 0000 0000 0000 0000 0000 0000 1111 |
| 00100 | 0000 0000 0000 0000 0000 0000 0001 1111 |
| ... | ... |
| 11110 | 0111 1111 1111 1111 1111 1111 1111 1111 |
| 11111 | 1111 1111 1111 1111 1111 1111 1111 1111 |

Similar to the description above, a parameter value of p bits (here p=12) is inputted to the parameter register, where the five least significant bits are inputted to a multiplexer A or optionally directly to the 5 bit input of the combinational logic circuit. The combinational logic circuit produces a 32-bit word with one or more of the right most bits (most significant bits) set to the value "1" and the other bits set to the value "0". The number of bits having the value "1" is determined by the binary value of the 5-bit input. It is possible that this 32-bits word has 32 bits with the value "1".

For generating a large number the state machine is inputted with a starting pulse, causing it to load the counter with the seven most significant bits of the 12-bit parameter of the parameter register. The state machine decrements the down counter, while setting the selection input S of MUX B to "0" and the selection input S of MUX A to "1", resulting in an output word having a length of 32 bits with all "1". If the counter was originally set to "0", no data words are generated in this state. When the down counter reaches "0" both the selection inputs S of MUX A and MUX B are set to "0" for one clock cycle by the state machine, so a 32-bit word with a one or more bits in the rightmost positions having the value "1" is output. The number of the bits, having the value "1", is determined by the binary value of the five least significant bits of the parameter register, according to Table B. It is possible that this word contains only bits with the value "1".

Then the state machine sets the selection input S of MUX 6 to "1", thereby generating words with a length of 32 bits all having the value "0".

The large number generator circuit operates in the same manner as described above, where it is controlled by the switch/control unit (state machine).

The large number generator circuit can be added to or incorporated in the arithmetic processing circuit to supply input operands to the arithmetic processing circuit. The implementation of the large number generator circuit is an alternative and improvement for supplying these input operands, compared to loading the input operands from memory if the operands have special values, as in the present applications, As stated above in the present applications when generating large numbers memory space needs to be reserved for the large operands, or the RAM size of the circuit needs to be increased. Furthermore an additional control unit Is required for storing the entire operand value into the memory. This will require additional processing time, making the present applications slow and more complicated.

With the use of the large number generator circuit according to the present invention there will be no need to reserve memory space for processing the operand. Moreover due to the fact that a single parameter has to be written, the large number generator circuit requires much less processing time for generating a large number.

The invention claimed is:

1. Large number generator circuit for generating large numbers, said circuit comprising:
   a processing unit having a first input, a second input, and an output;
   an arithmetic unit for generating a large number, said arithmetic unit having an input;
   first means having an output for providing a first operand with a number of p bits to the first input of the processing unit; and
   second means having an output for providing a second operand with a second number of bits to the second input of the processing unit, said second operand being generated by said second means using a parameter having a fewer number of bits than the number of p bits of the first operand,
   wherein said output of said processing unit is operatively connected to said input of said arithmetic unit for generating a large number.

2. Large number generator circuit according to claim 1, wherein said second means generates said second operand using a combinational logic circuit, having at least one input of m bits, with $m \leq p$.

3. Large number generator circuit according to claim 2, wherein said second operand has a length of n bits, wherein a number of the least significant bits of said n bits have the same binary value.

4. Large number generator circuit according to claim 3, wherein said number of least significant bits having the same binary value is determined by a p bit parameter.

5. Large number generator circuit according to claim 4, wherein a value of p bits of said parameter corresponds to a number of least significant bits of values of said parameter.

6. Large number generator circuit according to claim 2, wherein the number of p-m most significant bits of a value of said parameter are input to a counter.

7. Large number generator circuit according to claim 2, wherein the number of n bits of said first and second operand is determined by the value $2^m$.

8. Large number generator circuit according to claim 7, wherein m is 5.

9. Large number generator circuit according to claim 1, wherein said second operand has a length of n bits, wherein all but one bit of said bits have the same binary value.

10. Large number generator circuit according to claim 9, wherein a position of the bit having a different binary value is determined by a p bit parameter.

11. Large number generator circuit according to claim 1, wherein said first means comprise memory means, wherein at least said first operand is stored.

12. Large number generator circuit according to claim 1, wherein the large numbers are generated as a sequence of w binary words of k bits each.

13. Large number generator circuit according to claim 12, wherein the value of $2^p \geq w*k$.

14. Large number generator circuit for generating large numbers, said circuit comprising:
   a processing unit having a first input, a second input, and an output;
   an arithmetic unit for generating a large number, said arithmetic unit having an input;
   first means having a switch/control input and an output for providing a first operand with a number of p bits to the first input of the processing unit; and
   second means having a switch/control input and an output for providing a second operand with a second number of bits to the second input of the processing unit,
   wherein said output of said processing unit is operatively connected to said input of said arithmetic unit for generating a large number, and wherein said second operand is generated using the first means or the second means, depending on the switch/control input, using a parameter having a fewer number of bits than the number of p bits of the first operand.

* * * * *